United States Patent
Shah et al.

[11] Patent Number: 6,076,774
[45] Date of Patent: Jun. 20, 2000

[54] FUEL AND THERMAL OPTIMAL SPIRAL EARTH ACQUISITION

[75] Inventors: Piyush R. Shah, Germantown, Md.; Thomas M. Tanner, Aurora, Colo.; Richard A. Noyola, Torrance, Calif.

[73] Assignee: Hughes Electronics Corporation, El Segundo, Calif.

[21] Appl. No.: 09/132,343

[22] Filed: Aug. 12, 1998

[51] Int. Cl.$^7$ .................................................. B64G 1/24
[52] U.S. Cl. ........................ 244/164; 342/354; 701/222; 701/226
[58] Field of Search .................... 244/164, 168, 244/171; 701/4, 13, 226, 222; 342/354

[56] References Cited

U.S. PATENT DOCUMENTS

| | | | |
|---|---|---|---|
| 4,358,076 | 11/1982 | Lange et al. | 244/164 |
| 4,680,718 | 7/1987 | Sasaki et al. | 364/455 |
| 5,035,381 | 7/1991 | Matthews | 244/164 |
| 5,080,307 | 1/1992 | Smay et al. | 244/164 |
| 5,132,910 | 7/1992 | Scheit et al. | 364/459 |
| 5,257,759 | 11/1993 | Bender | 244/168 |
| 5,257,760 | 11/1993 | Savoca | 244/171 |
| 5,289,998 | 3/1994 | Bingley et al. | 244/173 |
| 5,412,574 | 5/1995 | Bender et al. | 364/455 |
| 5,458,300 | 10/1995 | Flament et al. | 244/169 |
| 5,535,965 | 7/1996 | Surauer et al. | 244/174 |
| 5,556,058 | 9/1996 | Bender | 244/171 |
| 5,558,305 | 9/1996 | Surauer et al. | 244/171 |
| 5,717,404 | 2/1998 | Malla | 342/357 |
| 5,749,545 | 5/1998 | Gnatjuk | 244/164 |
| 5,794,891 | 8/1998 | Polle et al. | 244/164 |
| 5,816,540 | 10/1998 | Murphy et al. | 244/173 |
| 5,826,828 | 10/1998 | Fowell et al. | 244/164 |
| 5,852,792 | 12/1998 | Nielson | 701/222 |
| 5,862,495 | 1/1999 | Small et al. | 701/13 |
| 5,865,402 | 2/1999 | Fischer et al. | 244/166 |
| 5,895,014 | 4/1999 | Sullivan | 244/168 |
| 5,934,620 | 8/1999 | Abernathy | 244/168 |

*Primary Examiner*—Michael J. Carone
*Assistant Examiner*—Fredrick T. French, III
*Attorney, Agent, or Firm*—Georgann S. Grunebach; M. W. Sales

[57] ABSTRACT

A system and method for acquiring the Earth by a three-axis stabilized spacecraft in the presence of a significantly time-varying Sun-Earth angle including obtaining an Earth cone described by rotating the nadir vector about the Sun vector, slewing the spacecraft about an axis until the Earth sensor boresight touches an edge of the Earth cone, updating the Earth cone due to the changing Sun-Earth separation angle, performing a spiral coning maneuver about the updated Earth cone until the Earth sensor detects the Earth, and locking onto the Earth so as to hold the Earth sensor boresight coincident with the nadir vector. Additionally, the spacecraft may be rotated about the nadir vector so as to bring the spacecraft into a desired final attitude.

11 Claims, 3 Drawing Sheets

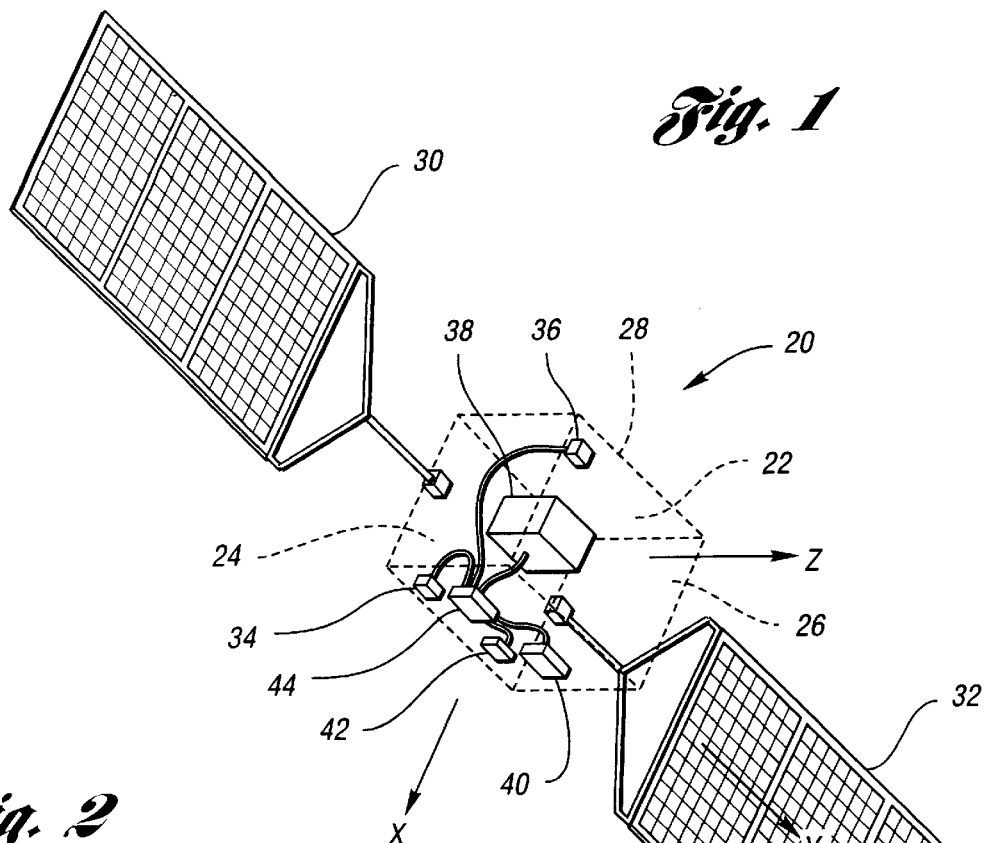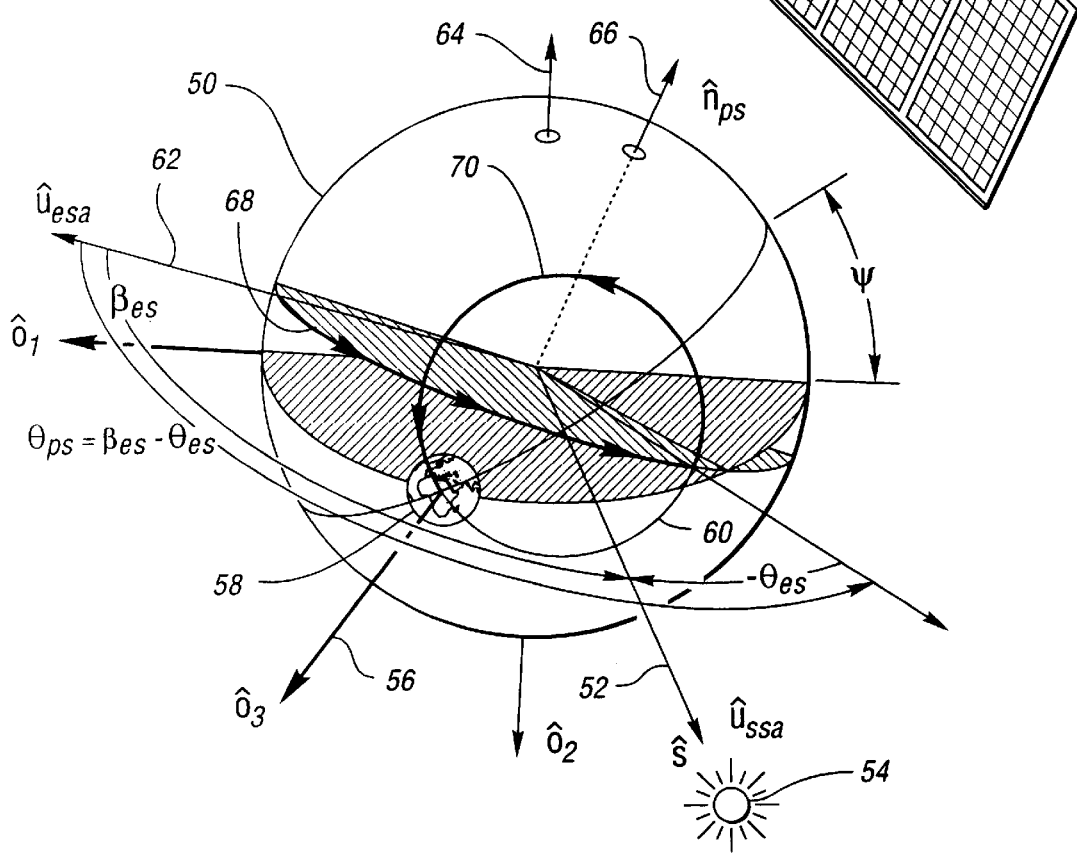

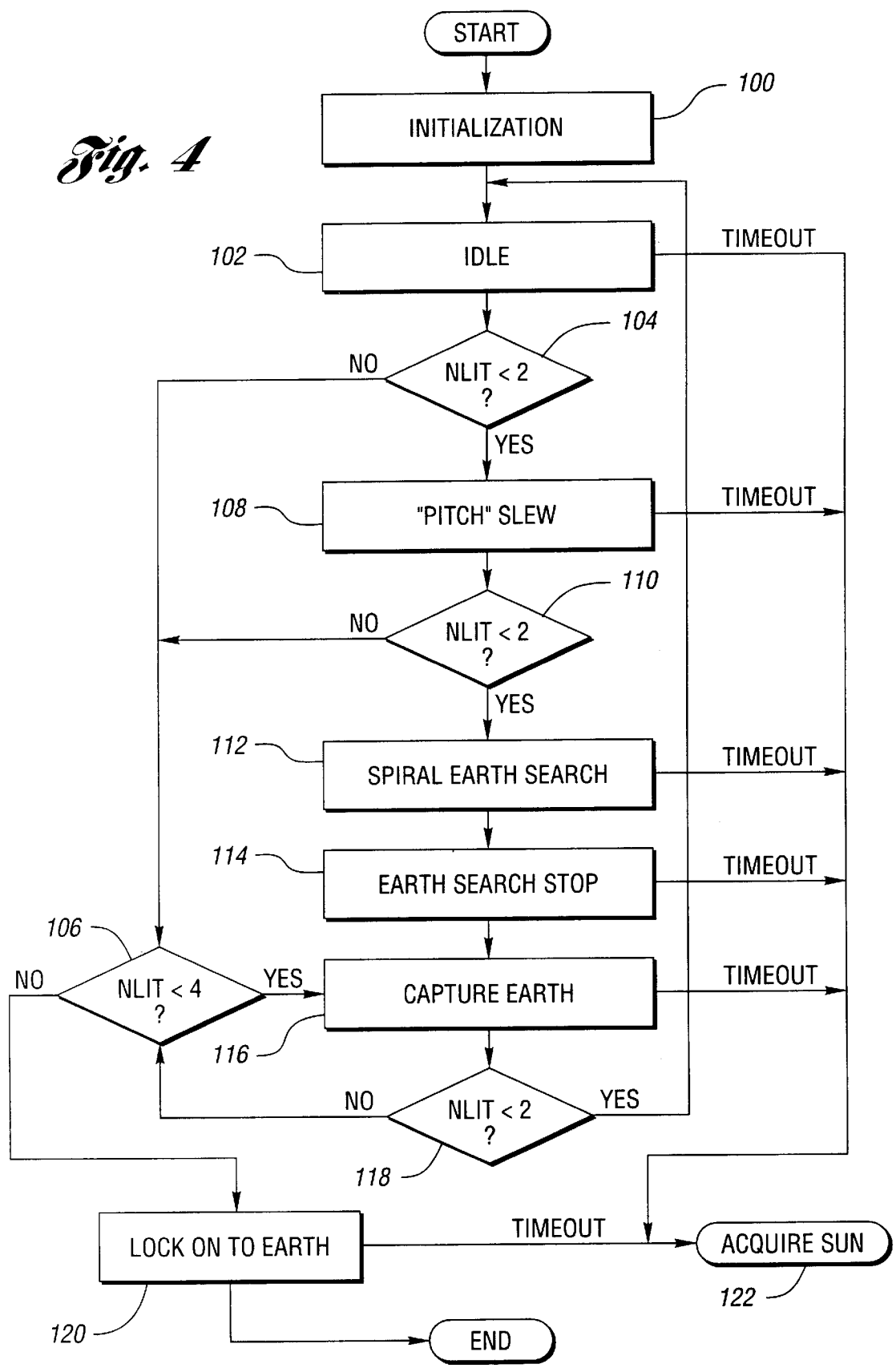

FUEL AND THERMAL OPTIMAL SPIRAL EARTH ACQUISITION

TECHNICAL FIELD

The present invention relates in general to attitude control of a spacecraft and in particular to acquiring Earth lock for a three-axis stabilized spacecraft.

BACKGROUND ART

Many spacecraft, such as Earth-orbiting communication satellites, require a particular attitude relative to the Earth. Maneuvers to acquire the Earth should take minimal time, since loss of Earth lock often means that the spacecraft is not performing mission objectives. A related concern is that the spacecraft may be in unsafe thermal attitudes for an unacceptable duration. Many maneuvers to acquire the Earth currently require torques of a magnitude that can only be supplied by thrusters, using limited fuel thereby potentially shortening the effective life of the spacecraft mission.

A typical Earth acquisition method is described in U.S. Pat. No. 5,080,307 titled "Spacecraft Earth-Pointing Attitude Acquisition Method" to Smay, Yocum and Hummel. The method starts with the spacecraft roll axis initially pointing towards the Sun. An Earth sensor is along the yaw axis. Hence, the first maneuver is a slew about the pitch axis. The slew is stopped when the Earth sensor boresight crosses a Sun centered Earth cone. This cone is formed by taking a line from the spacecraft to the Earth (Earthline) and sweeping it around an axis formed by a line between the spacecraft and the Sun (Sunline). The cone is determined from ground-based calculations and transmitted to the spacecraft. In the next step, the spacecraft performs a coning maneuver about the Sunline, moving the boresight of the Earth sensor along the Sun-centered Earth cone. Under normal conditions, the maneuver halts when the Earth sensor fully detects the Earth.

Several difficulties arise with the maneuver just described and other similar methods. First, the spacecraft must be initially pointing towards the Sun.

Second, the coning maneuver about the Sunline does not account for time-varying Sun-Earth geometry. Such variations are important in low or medium Earth orbits which have orbit times that may be a fraction of one day. Not compensating for changing Sun-Earth geometry limits the time in which the coning maneuver can be accomplished, thereby requiring large coning rates to ensure that the Earth does not move out of the sensor swept field-of-view before the search is complete. Typically, thrusters are required to realize the large coning rates, expending limited fuel.

Third, the method does not provide the capability to orient the spacecraft in an optimal thermal attitude.

Fourth, ground-based calculations during the maneuver are required.

SUMMARY OF THE INVENTION

As such, one object of the present invention is to acquire the Earth in a fuel optimized manner.

Another object of the present invention is to acquire the Earth starting from any initial attitude at any local time-of-day.

Still another object of the present invention is to acquire the Earth in either an optimal thermal, orbit normal, or orbit anti-normal attitude, as desired.

Yet another object of the present invention is to acquire the Earth under conditions of significantly changing geometries between the Earth, the Sun, and the spacecraft relative to maneuver execution time.

A further object of the present invention is to acquire the Earth autonomously, without any ground-based calculations required during the maneuver.

A still further object of the present invention is to acquire the Earth in the presence of mass property variations such as non-deployed wings, eclipse conditions, and single actuator failures.

Yet a further object of the present invention is to allow a spacecraft geometry with the Earth sensor boresight located out of the roll-yaw plane.

In carrying out the above objects and other objects and features of the present invention, a method is provided to obtain an Earth cone described by rotating the nadir vector about the Sun vector, slew the spacecraft about an axis until the Earth sensor boresight touches an edge of the Earth cone, update the Earth cone due to the changing Sun-Earth separation angle, perform a spiral coning maneuver about the updated Earth cone until the Earth sensor detects the Earth, and lock onto the Earth so as to hold the Earth sensor boresight coincident with the nadir vector.

In one embodiment, the spacecraft is rotated about the nadir vector so as to bring the spacecraft into a desired final attitude. The edge of the Earth cone used to determine the end of the Earth sensor boresight slewing maneuver can be determined so as to minimize the rotation required to bring the spacecraft into its desired final attitude.

Another embodiment slews the solar wings in an opposite direction to the boresight slewing maneuver so as to maintain a previously obtained Sun-pointing attitude for the wings.

Another embodiment places the solar wings in a Sun search mode during Earth acquisition so as to obtain a Sun pointing attitude for the wings.

Another embodiment suspends Earth acquisition while the spacecraft is in a blackout region.

A further embodiment starts a timer during initialization that will reach a timeout after a set period of time and terminates Earth acquisition if the Earth is not acquired prior to timeout.

In the preferred embodiment, all of the previous embodiments are included.

A system is also provided in accordance with the present invention. The system includes an Earth sensor, one or more additional sensors for determining the attitude of the spacecraft, one or more actuators for modifying the attitude of the spacecraft, ephemeris models of the Earth and the Sun relative to the spacecraft, and a control logic in communication with the Earth sensor, the attitude sensors, the ephemeris models, and the one or more actuators in order to carry out Earth acquisition.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a graphical representation of a spacecraft that may use the method according to the present invention;

FIG. 2 is a polar plot illustrating an example sequence of maneuvers according to the present invention;

FIG. 4 is flow diagram representing operation of a system or method according to the present invention.

BEST MODE FOR CARRYING OUT THE INVENTION

Figure 3:
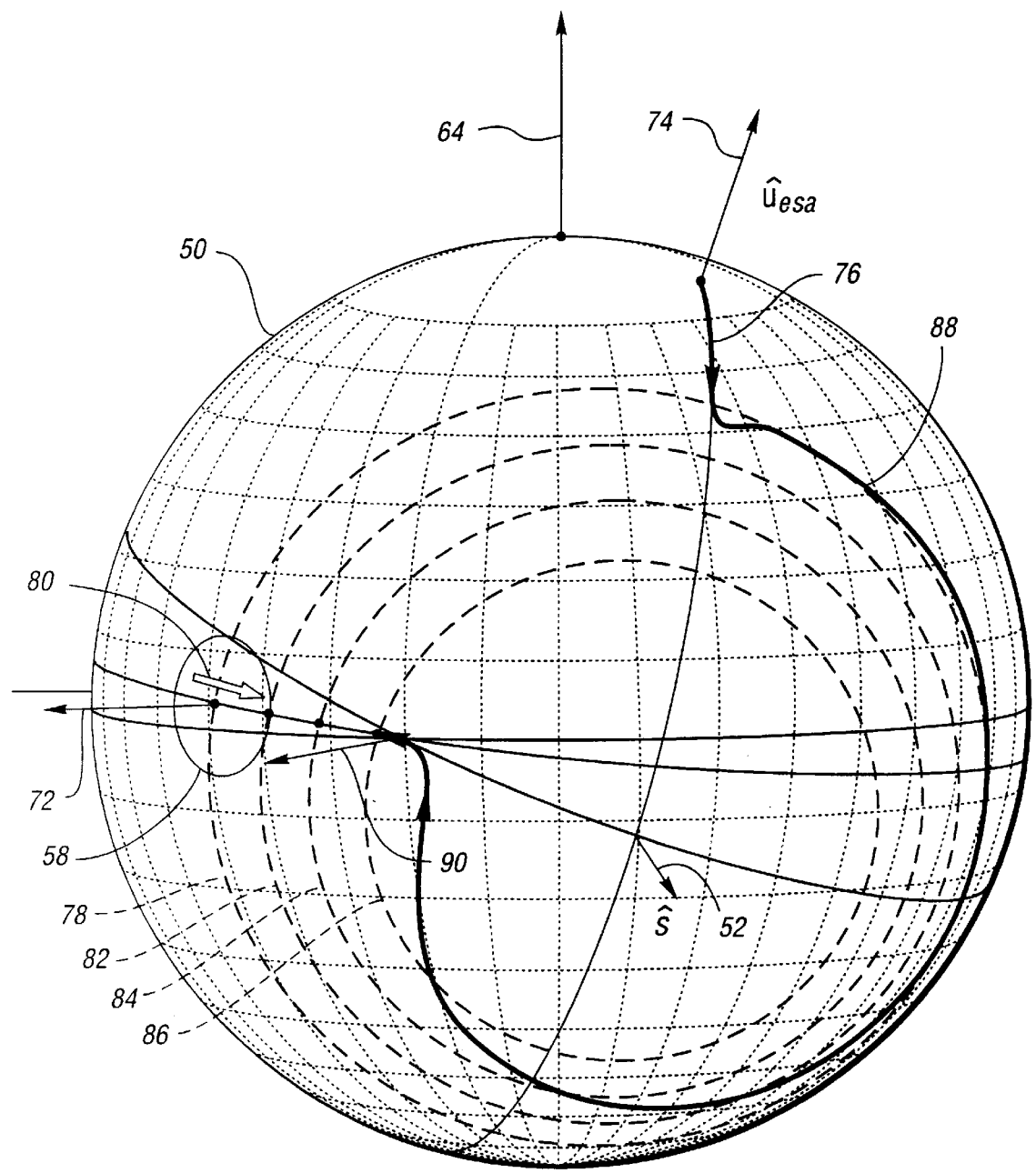
FIG. 3 is a polar plot further illustrating the spiral coning maneuver according to the present invention.

Referring now to FIG. 1, a graphical representation of a spacecraft for using the method of the present invention is shown. A spacecraft, shown generally as 20, has a body 22. An orthonormal body frame is indicated by the x or roll axis, y or pitch axis, and z or yaw axis. Body 22 includes a north radiator 24 on the north or −y face, a south radiator 26 on the south or +y face, and a west radiator 28 on the west or −x face. Each radiator radiates waste heat from the spacecraft into space. In order to operate most efficiently, each radiator must not face towards the Sun.

North solar wing 30 is rotatively attached to the north face of body 22. South solar wing 32 is rotatively attached to the south face of body 22. Both wings can be made to rotate about an axis parallel to the pitch axis by solar wing drives not shown. Solar cells, also not shown, may be coupled so as to rotate with both wings.

In one embodiment, Sun sensor 34 is attached to the positive x face of spacecraft body 22, and may be a wide field of view Sun sensor array (SSA) In another embodiment, Sun position is obtained by slewing solar wings 30 and 32 until a maximum current is obtained from the solar cells. The position of wings 30 and 32 relative to body 22 indicate a projection of the Sun vector onto the roll-yaw plane.

Spacecraft 20 also includes an Earth sensor 36, shown mounted on the +z face. In the preferred embodiment, this is an Earth sensor array (ESA) with four detectors. A set of momentum wheels 38 provides three-axis torque for attitude modification. Alternatively, thrusters, not shown, may be used to produce torques for attitude alteration. A set of three-axis gyroscopes 40 senses changes in attitude. Ephemeris models 42 describe the geometric relationships between the Sun, the Earth, and spacecraft 20. A control logic 44, in communication with Sun sensor 34, Earth sensor 36, gyroscopes 40, ephemeris models 42, and momentum wheels 38, accepts input from sensors and ephemeris models and produces signals to actuators so as to accomplish the present invention.

Referring now to FIG. 2, an example of a sequence of spacecraft maneuvers according to the present invention is shown. Unit sphere 50 is centered on spacecraft 20, not shown. Unit sphere 50 is fixed in inertial space and has an orbit normal reference frame described by orthonormal vectors $\hat{o}_1$, $\hat{o}_2$, and $\hat{o}_3$, with $\hat{o}_3$ pointing towards the Earth and $\hat{o}_2$ pointing towards orbit anti-normal. Sun vector ŝ, shown as 52, points towards the Sun 54. Nadir vector 56, which is the same as reference axis $\hat{o}_3$ in the orbit normal reference frame, points towards Earth, the projection of which onto unit sphere 50 is shown as 58. Sunline centered Earth cone 60 is formed by rotating nadir vector 56 about Sun vector 52, and represents the possible locations of Earth projection 58 onto unit sphere 50 knowing the direction of the Sun vector in the spacecraft body frame and knowing the position of spacecraft 20 relative to the Sun and Earth. This latter information may be obtained from on-board ephemeris models as is well known in the art. If a Sun acquisition maneuver is performed, Sun sensor boresight $\hat{u}_{ssa}$ is coincident with Sun vector ŝ. Initially, ESA boresight $\hat{u}_{esa}$, shown as 62, has not acquired the Earth. At the end of the maneuver, $\hat{u}_{esa}$ is aligned with nadir vector 56.

In addition to having ESA boresight 62 pointing at the Earth, a particular orientation of spacecraft body 22 about ESA boresight 62 may be desired. Many orientations are possible, with three of the most common being orbit normal, orbit anti-normal, and optimal thermal. Orbit normal attitude is one where spacecraft 20 z axis points towards the Earth ($\hat{o}_3$), y axis points towards orbit anti-normal (south or $\hat{o}_2$), and the x axis completes the right-handed orthogonal triad. Orbit anti-normal attitude is similar to orbit normal attitude except that the y axis points towards orbit normal (north), shown as 64. Optimal thermal attitude is one where radiators 24, 26, 28 are not exposed to the Sun.

The method of the present invention comprises three general phases. First, a slew brings ESA boresight 62 onto Sunline centered Earth cone 60. Second, a spiral coning maneuver about Earth cone 60, which may be changing in size during the maneuver, brings ESA boresight 62 in line with nadir vector 56. Third, a slew about ESA boresight 62 rotates spacecraft body 22 into a desired position. These three steps will be elaborated below.

In the first phase, the spacecraft is slewed about axis $\hat{n}_{ps}$ in the body frame, shown as 66. This axis is found by taking the cross product of Sun sensor boresight $\hat{u}_{ssa}$ and Earth sensor boresight $\hat{u}_{esa}$. Since ESA boresight 62 and the Sun sensor boresight are both part of the fixed configuration of spacecraft 20, the axis of rotation can be calculated prior to spacecraft launch. Typically, because $\hat{u}_{ssa}$ and $\hat{u}_{esa}$ lie in the roll-yaw plane, this slew is referred to as a "pitch" slew. However, it is clear from the above discussion that axis 66 need not be the pitch axis.

The "pitch" slew continues until Earth sensor boresight 62 crosses Earth cone 60. Either edge of cone 60 may be used. The edge may be chosen so as to minimize the rotation about ESA boresight 62. The desired attitude of spacecraft body 22 will determine which edge is chosen as is described in relation to FIG. 3 below. For the example shown in FIG. 2, the far edge of cone 60 is selected.

The angle swept by ESA boresight 62 during the "pitch" slew is $\theta_{ps}$, which can be found by taking the angle between ESA boresight vector $\hat{u}_{esa}$ and Sun vector ŝ, shown as $\beta_{es}$, and subtracting either the positive or negative Earth-Sun angle, shown as $\theta_{es}$, depending on whether the first or second edge of Earth cone 60 is desired. For the example shown in FIG. 2, a negative $\theta_{es}$ is subtracted from $\beta_{es}$. The path traced by ESA boresight 62 along unit sphere 50 during the "pitch" slew is indicated by 68.

If solar wings 30, 32 begin the "pitch" slew pointed at the Sun, as may be the case if spacecraft 20 had completed a Sun acquisition maneuver prior to Earth acquisition, the wings are rotated in the opposite direction to maintain a Sun-pointing attitude.

In the second phase, spacecraft 20 performs a spiral coning maneuver about Sun vector 52 along Sunline centered Earth cone 60. If the coning maneuver is performed rapidly, the positions of the Earth and Sun relative to spacecraft 20 will not vary significantly during the coning maneuver. This is the case shown in FIG. 2. However, if spacecraft 20 is in a rapid Earth orbit, as may be the case for a communication satellite orbiting the Earth every six hours, or if spacecraft 20 performs the coning maneuver over a relatively long period of time, as may be the case if torques from momentum wheels are used to implement the maneuver, the relative positions of the Earth and Sun may vary significantly during the coning maneuver. Hence, an expanding or contracting spiral is traced by ESA boresight 62 on unit sphere 50. An example of a spiral-shaped coning path is illustrated with regards to FIG. 3 below. The coning maneuver is halted when Earth sensor 36 acquires the Earth, as will be further elaborated with regards to FIG. 4 below. The path traced by ESA boresight 62 along unit sphere 50 during the coning maneuver is indicated by 70.

In the third phase, spacecraft 20 slews about nadir vector 56 until spacecraft body 22 is in a desired orientation. Possible orientations include orbit normal, orbit anti-normal, and optimal thermal. The nadir slew is shown in FIG. 2 as rotation by angle ψ.

Referring now to FIG. 3, a spiral-shaped coning path is illustrated. Unit sphere 50 is centered on spacecraft 20 not shown. Unit sphere 50 is fixed in a Sun-normal inertial reference frame. Sun vector 52 and orbit normal north 64 remain fixed throughout the maneuver. At the beginning of Earth acquisition, ESA boresight has direction shown by 74. The path taken by the ESA boresight during the "pitch" slew maneuver is shown by 76. At the end of the "pitch" slew, the Earth, projection onto unit sphere 50 shown as 58, has nadir vector 72. The Sun centered Earth cone at the end of the "pitch" slew is shown as dashed line 78.

The Earth is moving relative to the Sun in a direction indicated by vector 80. Throughout the coning maneuver, the relative Earth movement changes the Sun-Earth separation angle, causing the size of the Earth cone to change. In this illustration, the projection onto unit sphere 50 of the changing Earth cone is shown by successively shrinking dashed circles 82, 84, and 86. In order to stay on the changing Earth cone edge, the ESA boresight path must trace a spiral path. The path traced by ESA boresight $\hat{u}_{esa}$ during the spiral coning maneuver is shown by 88, with final nadir vector 90.

Referring now to FIG. 4, a flow diagram of a preferred embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

The method starts with an initial spacecraft attitude with respect to a Sun-normal reference frame. The Sun-normal reference frame is fixed to the spacecraft and has an x axis directed from the spacecraft to the Sun and y and z axes arbitrary but forming a right-handed orthogonal triad.

Initialization is performed 100. This step is the default step and is entered when Earth acquisition is commanded. During this step, spacecraft 20 hardware and software are initialized and configured to acquire Earth.

Once the Earth acquisition sequence is initiated, autonomous checks for spacecraft 20 traveling in blackout regions are made. Blackout regions occur around local noon and midnight as spacecraft 20 passes between the Earth and the Sun and as spacecraft 20 moves through an Earth-induced solar eclipse. The size of the blackout region depends on Earth sensor 36 type as well as the geometric relationships between spacecraft 20, the Earth, and the Sun. If spacecraft 20 is in a blackout region, capability is provided to suspend the sequence until the "blackout" has ended. Although not required, suspending the sequence avoids Sun intrusion in Earth sensor 36 and avoids unfavorable geometry for the autonomous yaw attitude maneuver described below.

Idle is performed 102. This step can be started following initialization or from any of the remaining steps if Earth acquisition is aborted. In this step, an estimator-based controller is configured to control spacecraft 20 inertial attitude and rate using gyroscopes 40. The rate command is set to zero. Normally, the duration of this step is brief. Exceptions may occur from some failure modes, where Earth acquisition may remain suspended until interrupted by a ground-based signal.

The next step after idle depends on the number of illuminated Earth sensor detectors, as represented by variable NLIT. If NLIT is less than two, as determined in block 104, "Pitch" Slew 108 is performed. If NLIT is four, as determined in block 106, Lock On To Earth 120 is performed. If NLIT is two or three, Capture Earth 116 is performed.

A "pitch" slew is performed 108. In this step, the spacecraft is slewed about an axis to place ESA boresight 62 on Earth cone 60. Determining the axis of rotation is described with regards to FIG. 2 above. To determine the instantaneous slew angle $\theta_{ps}$, Sun-Earth separation angle $\theta_{es}$ is first computed using Equation (1):

$$\theta_{es} = K \cdot \text{sign}(^0s_1) \cdot \cos^{-1}(^0s_3) \tag{1}$$

where $^0s_1$ and $^0s_3$ are the roll and yaw components of unit Sun vector 52 in orbit frame and K is the desired orientation of the spacecraft pitch axis after acquisition (1 for orbit normal and optimal thermal, and −1 for orbit anti-normal). Note that angle $\theta_{es}$ is wrapped to ±π.

Also, the angle between ESA boresight 62 and Sun vector 52, $\beta_{es}$, is calculated using Equation (2):

$$\beta_{es} = \cos^{-1}(\hat{u}_{esa} \cdot \hat{u}_{ssa}) \tag{2}$$

where • is the vector dot product. From this, the "pitch" slew angle is computed as in Equation (3):

$$\theta_{ps} = \beta_{es} - \theta_{es} \tag{3}$$

The slew axis and slew angle are combined to generate a canonical attitude command in quaternion form relative to the Sun-normal reference frame as in Equation (4):

$$\hat{q}_{b \rightarrow s}{}^c = \hat{q}_{sun} \otimes \hat{q}_{ps} \tag{4}$$

where ⊗ is the quaternion multiplication operation, $\hat{q}_{ps}$ is the "pitch" slew command quaternion, and $\hat{q}_{sun}$ is the Sun pointing command. The "pitch" slew command is defined in Equation (5):

$$\hat{q}_{ps} = \begin{bmatrix} \hat{n}_{ps} \cdot \sin(\theta_{ps}/2) \\ \cos(\theta_{ps}/2) \end{bmatrix} \tag{5}$$

where $\hat{n}_{ps}$ is defined mathematically in equation (6):

$$\hat{n}_{ps} = \frac{(\hat{u}_{esa} \times \hat{u}_{ssa})}{|\hat{u}_{esa} \times \hat{u}_{ssa}|} \tag{6}$$

with × representing vector cross product. The Sun pointing command represents a Sun-to-body frame mapping, and is expressed in Equation (7):

$$\hat{q}_{sun} = \begin{bmatrix} \hat{n}_{sun} \cdot \sin(\theta_{sun}/2) \\ \cos(\theta_{sun}/2) \end{bmatrix} \tag{7}$$

where $\hat{n}_{sun}$ is the unit vector lying along the axis of rotation necessary to bring the Sun sensor onto ŝ given by Equation (8):

$$\hat{n}_{sun} = \frac{(\hat{u}_{ssa} \times \hat{s})}{|\hat{u}_{ssa} \times \hat{s}|} \qquad (8)$$

where $\theta_{sun}$ is the angle between the Sun sensor boresight and Sun vector $\hat{s}$ given by Equation (9):

$$\theta_{sun} = \cos^{-1}(\hat{u}_{ssa} \cdot \hat{s}) \qquad (9)$$

Once the commanded "pitch" attitude is initialized, a "pitch" rate is commanded to track the relative Sun-Earth motion. On-board logic autonomously updates the attitude command by integrating the rate command. The body rate commanded in the body frame is computed according to Equation (10):

$$^{b \to c}\omega_{b\_s} = \eta_{sns} \cdot K \cdot \frac{-|\Omega_0 \cdot {}^0 s_1|}{\sqrt{1 - ({}^0 s_3)^2}} \cdot \hat{n}_{ps} \qquad (10)$$

where $\eta_{sns}$ is $-1$ if thermal optimal attitude is desired and if ${}^0 s_1 < 0$, and is 1 otherwise. To avoid singularity at ${}^0 s_3 = 1$, each component of the rate command is limited to $\pm \Omega_0$, the orbit rate. If the spacecraft is in a sensor blackout region, a singularity is also not possible.

When the "pitch" slew is complete and attitude error is less than a threshold value, the number of illuminated Earth sensor detectors is again examined to determine the next step. If NLIT is less than two, as determined in block 110, Spiral Earth Search 112 is performed. If NLIT is greater than four, as determined in block 106, Lock On To Earth 120 is performed. If NLIT is two or three, Capture Earth 116 is performed.

Spiral Earth Search 112 is performed. After completion of "Pitch" Slew 108, if the Earth is not present, a spiral coning maneuver about Sun vector 52 along Earth cone 60 is begun. Since the angular relationship between spacecraft 20, the Earth and the Sun may change significantly during the coning maneuver, the size of Earth cone 60 is updated. This produces the spiral shape of the coning maneuver. The spiral coning rate command of spacecraft body 22 relative to the steered frame is given by Equation (11):

$$^{b \to c}\omega_{b\_s} = \eta_{sns} \cdot K \cdot \left( \frac{-|\Omega_0 \cdot {}^0 s_1|}{\sqrt{1 - ({}^0 s_3)^2}} \right) \cdot \hat{n}_{ps} + \Omega_{cone} \cdot C_{b\_ref} \cdot \begin{bmatrix} \sin\beta_{es} \\ 0 \\ \cos\beta_{es} \end{bmatrix} \qquad (11)$$

where $\Omega_{cone}$ is the coning rate and $C_{b \to ref}$ is a direction cosine matrix mapping a reference frame vector into the body frame. The first term of the sum in Equation (11) represents adjustment of the coning rate command for changing Sun position relative to the Earth-oriented orbit normal reference frame. To avoid singularity at ${}^0 s_3 = 1$, each component of the rate command is limited to $\pm \Omega_0$. If the spacecraft is in a sensor blackout region, a singularity is also not possible.

When Earth sensor 36 detects the Earth in roll, the slew rate is reduced. When the roll error changes sign, the Earth Search Stop step is entered.

Earth Search Stop 114 is performed. This step nulls the spacecraft body rates and holds the attitude where the roll zero-crossing was detected. This is accomplished by setting the rate command to zero, as shown in Equation (12):

$$^{b \to c}\omega_{b\_s} = [0 \ 0 \ 0] \qquad (12)$$

As a consequence of setting the commanded rate to zero, the Earth is not tracked. Therefore this step transitions to Capture Earth 116 as soon as the spacecraft attitude error has settled. This is typically a short period of time and, hence, the error accumulation is small.

Capture Earth 116 is performed. This step uses Earth sensor 36 roll information, pitch information or both to steer the spacecraft to center the Earth in the Earth sensor detectors. The rate command in this step is given by Equation (13):

$$^{b \to c}\omega_{b\_s} = \Omega_{cap} \cdot \hat{A}_{dir} \qquad (13)$$

where $\Omega_{cap}$ is a reprogrammable constant representing the magnitude of the capture rate and $\hat{A}_{dir}$ is a three-element vector representing the acquisition steering direction based on Earth sensor detector illumination status. The roll component, pitch component or both components of $\hat{A}_{dir}$ can be $-1$, 0, or 1. The yaw component is always zero.

If, while performing Capture Earth 116, less than two Earth sensor detectors are illuminated, as determined in block 118, Idle step 102 is entered. If NLIT is four, as determined in block 106, Lock On To Earth 120 is entered. If NLIT is two or three, Capture Earth 116 is continued.

Lock On To Earth 120 is performed. In this step, Earth sensor 36 roll and pitch information along with information from three-axis gyroscope 40 are used to lock on to and hold the Earth. The commanded attitude and rate are set to zero. Spacecraft 20 yaw attitude estimate, $\psi$, with respect to an orbit normal reference frame is then initialized based on the known geometry. Specifically, once the attitude errors have settled, spacecraft 20 z axis points towards Earth center 56, Sun vector 52 is in spacecraft 20 roll-yaw plane, and spacecraft 20 y axis is given by the cross product between the body z axis and Sun vector 52 in the body frame. North or south orientation of the body y axis depends on whether orbit normal, orbit anti-normal, or optimal thermal attitude is desired. Spacecraft 20 yaw attitude is determined by Equation (14):

$$\psi = \begin{cases} \tan^{-1}\left(\frac{{}^o s_2}{{}^o s_1}\right) + K\pi & {}^o s_2 > 0 \text{ and not optimal thermal} \\ \tan^{-1}\left(\frac{{}^o s_2}{{}^o s_1}\right) - K\pi & {}^o s_2 < 0 \text{ and not optimal thermal} \\ \tan^{-1}\left(\frac{{}^o s_2}{{}^o s_1}\right) & \text{otherwise} \end{cases} \qquad (14)$$

The quaternion representation is given by $\hat{q}_{b\_r}$ in Equation (15):

$$\hat{q}_{b\_r} = \begin{bmatrix} 0 & 0 & \sin\left(\frac{\psi}{2}\right) & \cos\left(\frac{\psi}{2}\right) \end{bmatrix}^T \qquad (15)$$

A timer may be started during Initialization 100. If a timeout occurs before Lock On To Earth 120 is completed, the acquisition sequence can be aborted. In one embodiment, a Sun acquisition sequence, shown as block 122, is initiated on timeout.

During Earth acquisition, a Sun search may be performed. Solar wings 30 and 32 may be slewed and the level of current from solar panels obtained. By examining the derivative of the current level for maximums, solar wings 30 and 32 can be placed in a Sun-pointing attitude.

While the best mode for carrying out the present invention has been described in detail, those familiar with the art to which this invention relates will recognize various alternative designs and embodiments within the scope and spirit of the present invention as defined by the following claims.

What is claimed is:

1. A method of acquiring the Earth by a three-axis stabilized spacecraft, the spacecraft having an Earth sensor with a boresight direction and a Sun sensor with a boresight direction, wherein a first vector from the spacecraft to the Sun defines a Sun vector, a second vector from the spacecraft to the Earth defines a nadir vector, and wherein the angle between the Sun vector and the nadir vector defines a Sun-Earth separation angle, the Sun-Earth separation angle changing over time due to the relative movements of the Earth, the Sun and the spacecraft, the method comprising:

obtaining an Earth cone described by rotating the nadir vector about the Sun vector;

determining a slewing axis by taking the cross product of the Earth sensor boresight with the Sun sensor boresight;

determining which edge of the Earth cone will be used to stop the slew based on the desired final attitude of the spacecraft;

slewing the spacecraft about the slewing axis until the Earth sensor boresight touches the determined edge of the Earth cone;

updating the Earth cone due to the changing Sun-Earth separation angle;

performing a spiral coning maneuver about the updated Earth cone until the Earth sensor detects the Earth;

locking onto the Earth so as to hold the Earth sensor boresight coincident with the nadir vector; and rotating the spacecraft about the nadir vector so as to bring the spacecraft into a desired final orientation.

2. The method of acquiring the Earth as in claim 1, wherein the spacecraft has a body and wherein the spacecraft has one or more solar wings rotatively coupled to the spacecraft body, the solar wings having previously obtained a Sun-pointing attitude, the step of slewing the spacecraft about an axis until the Earth sensor boresight touches an edge of the Earth cone further comprising slewing the solar wings in an opposite direction so as to maintain a Sun-pointing attitude.

3. The method of acquiring the Earth as in claim 1, the spacecraft possibly entering a blackout region formed by a particular geometry of the Sun and the Earth relative to the spacecraft, the method further comprising suspending Earth acquisition while the spacecraft is in a blackout region.

4. The method of acquiring the Earth as in claim 1 further comprising:

starting a timer that will reach a timeout after a set period of time; and terminating Earth acquisition if the Earth is not acquired prior to the timeout.

5. The method of acquiring the Earth as in claim 1, wherein the spacecraft has a body, one or more solar wings are rotatively coupled to the spacecraft body, and one or more solar cells coupled to each wing are operative to produce a level of electrical current in proportion to the angle between a normal to the solar cell and the Sun, the method further comprising:

obtaining the level of current from one or more solar cells on each wing; and slewing each wing so as to maximize the current produced by the wing.

6. A system for acquiring the Earth by a three-axis stabilized spacecraft, wherein a first vector from the spacecraft to the Sun defines a Sun vector, a second vector from the spacecraft to the Earth defines a nadir vector, and wherein the angle between the Sun vector and the nadir vector defines a Sun-Earth separation angle, the Sun-Earth separation angle changing over time due to the relative movements of the Earth, the Sun and the spacecraft, the system comprising:

an Earth sensor with a boresight;

a Sun sensor with a boresight;

one or more actuators for modifying the attitude of the spacecraft;

ephemeris models of the Earth and the Sun relative to the spacecraft; and a control logic in communication with the Earth sensor, the Sun sensor, the ephemeris models, and the one or more actuators;

wherein the control logic is operative to obtain an Earth cone described by rotating the nadir vector about the Sun vector, determine a slewing axis by taking the cross product of the Earth sensor boresight with the Sun sensor boresight, determine which edge of the Earth cone will be used to stop the slew based on the desired final attitude of the spacecraft, slew the spacecraft about the slewing axis until the Earth sensor boresight touches the determined edge of the Earth cone, update the Earth cone due to the changing Sun-Earth separation angle, perform a spiral coning maneuver about the updated Earth cone until the Earth sensor detects the Earth, lock onto the Earth so as to hold the Earth sensor boresight coincident with the nadir vector, and rotate the spacecraft about the nadir vector so as to bring the spacecraft into a desired final orientation.

7. A system for acquiring the Earth as in claim 6 further comprising:

a spacecraft body; and one or more solar wings rotatively coupled to the spacecraft body.

8. A system for acquiring the Earth as in claim 7, the control logic further operative to slew the one or more solar wings in an opposite direction from the slew to rotate the Earth sensor to an edge of the Earth cone, the solar wing slew to maintain the solar wings in a previously attained Sun-pointing attitude.

9. A system for acquiring the Earth as in claim 6, the spacecraft possibly entering a blackout region formed by a particular geometry of the Sun and the Earth relative to the spacecraft, the control logic further operative to suspend Earth acquisition while the spacecraft is in a blackout region.

10. A system for acquiring the Earth as in claim 6, the control logic further operative to time the Earth acquisition and terminate Earth acquisition if the acquisition time exceeds a set value.

11. A system for acquiring the Earth as in claim 7, wherein one or more solar cells coupled to each solar wing are operative to produce a level of electrical current in proportion to the angle between a normal to the solar cell and the Sun, and wherein the control logic is further operative to obtain the level of current from one or more solar cells on each wing and slew each wing so as to maximize the current produced by the wing.

\* \* \* \* \*